United States Patent [19]

Tokugawa et al.

[11] Patent Number: 5,328,118
[45] Date of Patent: Jul. 12, 1994

[54] SEAT BELT RETRACTOR WITH PRETENSIONER

[75] Inventors: Osamu Tokugawa; Katsuo Takiura; Katsuyasu Ono; Shinobu Mogi; Toshifumi Taguchi; Osamu Kawai; Tatsuo Tada, all of Kanagawa, Japan

[73] Assignee: NSK Ltd., Japan

[21] Appl. No.: 8,968

[22] Filed: Jan. 26, 1993

[30] Foreign Application Priority Data

Jan. 27, 1992 [JP] Japan .................. 4-007256[U]

[51] Int. Cl.$^5$ ............................................. B60R 22/46
[52] U.S. Cl. ....................................................... 242/374
[58] Field of Search ......... 242/107, 107.4 R, 107.4 A, 242/107.4 B; 280/806; 297/478, 480

[56] References Cited

U.S. PATENT DOCUMENTS

| | | | |
|---|---|---|---|
| 4,447,017 | 5/1984 | Inukai | 242/107 |
| 4,449,443 | 5/1984 | Föhl | 91/392 |
| 4,471,918 | 9/1984 | Ando | 242/107 |
| 4,549,704 | 10/1985 | Föhl | 242/107 |
| 4,768,809 | 9/1988 | Andersson et al. | 280/806 |
| 4,889,068 | 12/1989 | Tabata et al. | 116/203 |
| 4,913,497 | 4/1990 | Knabel et al. | 297/480 |
| 4,948,171 | 8/1990 | Knabel et al. | 280/806 |
| 4,955,638 | 9/1990 | Kinoshita et al. | 280/806 |
| 5,129,679 | 7/1992 | Specht et al. | 280/806 |
| 5,165,718 | 11/1992 | Hamaue | 242/107 X |
| 5,169,173 | 12/1992 | Nishizawa | 242/107 X |

FOREIGN PATENT DOCUMENTS 2227642 8/1990 United Kingdom .
2237180 5/1991 United Kingdom .

Primary Examiner—John M. Jillions
Attorney, Agent, or Firm—Wegner, Cantor, Mueller & Player

[57] ABSTRACT

A seat belt retractor is provided with a pretensioner which comprises a wound-wire tightening mechanism and a drive means. The wound-wire tightening mechanism is composed of a pulley fixedly mounted on an end portion of a take-up spindle and a wire wound around the pulley with a small space left therebetween. The drive means comprises a piston connected to a free end of the wire, a cylinder with the piston movably received therein, a compression coil spring disposed in the cylinder to bias the piston in the pulling direction of the wire, and a trigger unit releasably holding the piston relative to the cylinder such that the piston can be maintained at a biased position against the resilient force of the compression coil spring but the holding of the piston at the biased position can be released responsive to an acceleration of at least a predetermined value.

10 Claims, 11 Drawing Sheets

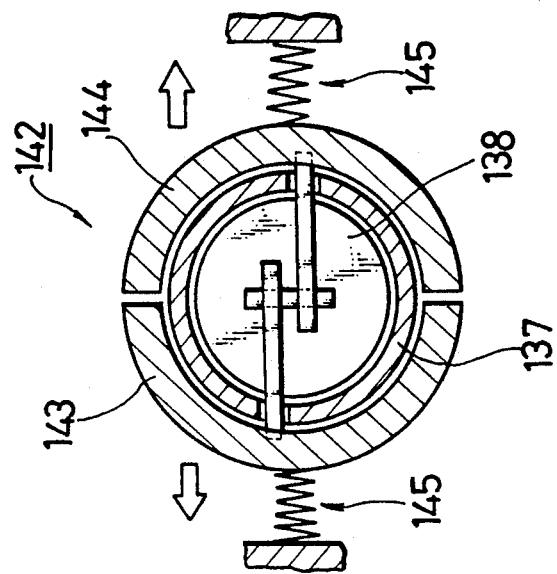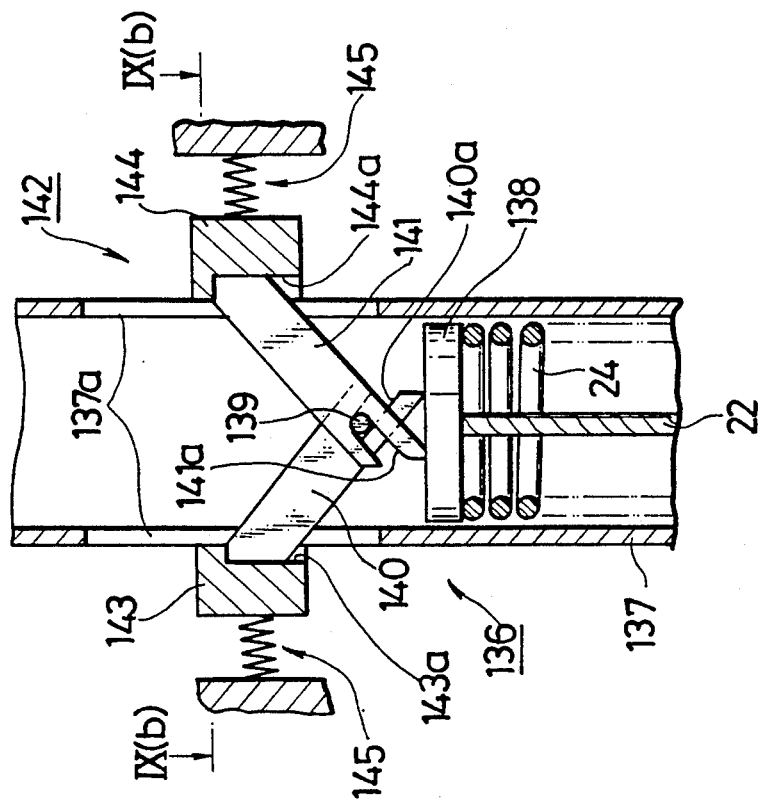

SEAT BELT RETRACTOR WITH PRETENSIONER

FIELD OF THE INVENTION a) Field of the Invention

The present invention relates to a seat belt retractor having a pretensioner so that webbing slack can be eliminated in the event of an emergency by absorbing it via a take-up spindle of a retractor.

b) Description of the Related Art

It has been current practice, when designing a seat belt to keep an occupant safe in a seat of a vehicle, to lower the webbing-winding tension of its retractor so there is less awareness of wearing a webbing. This however inevitably results in greater play or slack of the webbing, leading to the potential danger that in the event of an emergency such as collision of the vehicle, delayed restraint of the occupant results in failure to provide effective restraint.

To help eliminating such play or slack of the webbing by winding it in the event of an emergency, there have been proposed seat belt systems which are each equipped with a pretensioner assembled therein to instantaneously rotate in a winding direction a take-up spindle of its retractor.

The pretensioner comprises, for example, a cable wound around a pulley mounted on the take-up spindle of the retractor and a piston connected with one end of the cable and received slidably within a cylinder. By thrust or drive force produced based on the pressure of an expanding gas applied to the piston, pulling force is applied to the cable so that it causes the take-up spindle of the retractor to rotate in a webbing-winding direction. This makes it possible to wind in a webbing, said webbing being applied to an occupant, in the event of an emergency.

Such a pretensioner has, for instance, a wire housing disposed on a side wall of a base of a retractor which is a device for automatically winding in a webbing when the webbing is not in use; a wire wound as a cable around a pulley rotatably mounted on a take-up spindle within the wire housing with a small space left between the wire and the pulley; a piston connected to one end of the wire, a cylinder in which the piston is slidably received; and a gas generator for feeding high-pressure gas into the cylinder. The gas generator is internally equipped, for example, with a detonator heater, a detonator and a propellant. Responsive to a signal from a collision sensor, the detonator heater is heated so that the detonator is caused to burn. As a consequence, the propellant is ignited to produce gas.

In other words, as soon as the seat belt pretensioner begins to respond to the sensing of a vehicular collision by the collision sensor, the piston inside the cylinder is first driven upwardly by an expanding pressure of gas produced from the gas generator so that tension is applied to the wire. As a consequence, a portion of the wire, said portion being wound around the pulley, is tightened on an outer peripheral surface of the pulley. Frictional engagement therefore takes place between the wire portion wound around the pulley and the outer peripheral surface of the pulley whereby, when the piston is driven upwards further, the take-up spindle is driven in a webbing winding direction. As a result, a webbing applied to the occupant is wound in so that any play in the webbing is eliminated.

In such a pretensioner as described above, the gas generator as a drive means for applying tension to the wire drives the piston by the pressure of gas produced by explosion of the propellant. The pretensioner is therefore accompanied by the problems that its manufacture such as assembly are hazardous and it must be handled with infinite care. In addition, the pretensioner requires an electrical sensing means, such as a collision sensor, for electrically igniting the propellant of the gas generator to actuate the pretensioner, resulting in the problem that the construction becomes complex.

SUMMARY OF THE INVENTION

An object of the present invention is therefore to overcome the problems described above, that is, to provide a pretensioner-equipped seat belt retractor which can improve safety during assembly of the pretensioner, is of a simple construction, permits easier assembly and has a low price.

In one aspect of the present invention, there is thus provided a seat belt retractor having a pretensioner for bringing one end of a cable into engagement with a take-up spindle of the retractor in the event of a vehicular emergency whereby driving the cable at an opposite end thereof causes the take-up spindle to rotate in such a direction as to eliminate slack in a webbing, characterized in that said retractor comprises:

a retractor base;

a cylinder mounted on the base;

a piston connected to the opposite end of the wire and disposed within the cylinder movably under the guidance of the cylinder;

a resilient member biasing the piston in such a direction that the cable is pulled; and a trigger unit for holding the piston at a predetermined position against the biasing force of the resilient member, said holding of the piston being released responsive to an acceleration of at least a predetermined value.

According to the above-described construction of the present invention, the drive power for causing the take-up spindle of the retractor to rotate in a webbing-slack-eliminating direction is the resilient force of the resilient member such as a coil spring. The retractor of the present invention is therefore free from such a potential hazard that a propellant may explode during manufacture such as assembly. It is therefore possible to improve the safety upon assembly of the pretensioner. Further, it is not required to additionally provide an electrical sensing means such as a collision sensor because the trigger unit is also driven mechanically. The present invention can therefore provide a pretensioner-equipped seat belt retractor which is simple in construction, easy in assembly and low in price.

BRIEF DESCRIPTION OF THE DRAWINGS

The above and other objects, features and advantages of the present invention will become apparent from the following description and the appended claims, taken in conjunction with the accompanying drawings, in which:

FIGS. 9(a) and 9(b) are fragmentary cross-sectional view of a drive means according to a sixth embodiment of the present invention;

DETAILED DESCRIPTION OF THE INVENTION AND PREFERRED EMBODIMENTS

Figure 1:
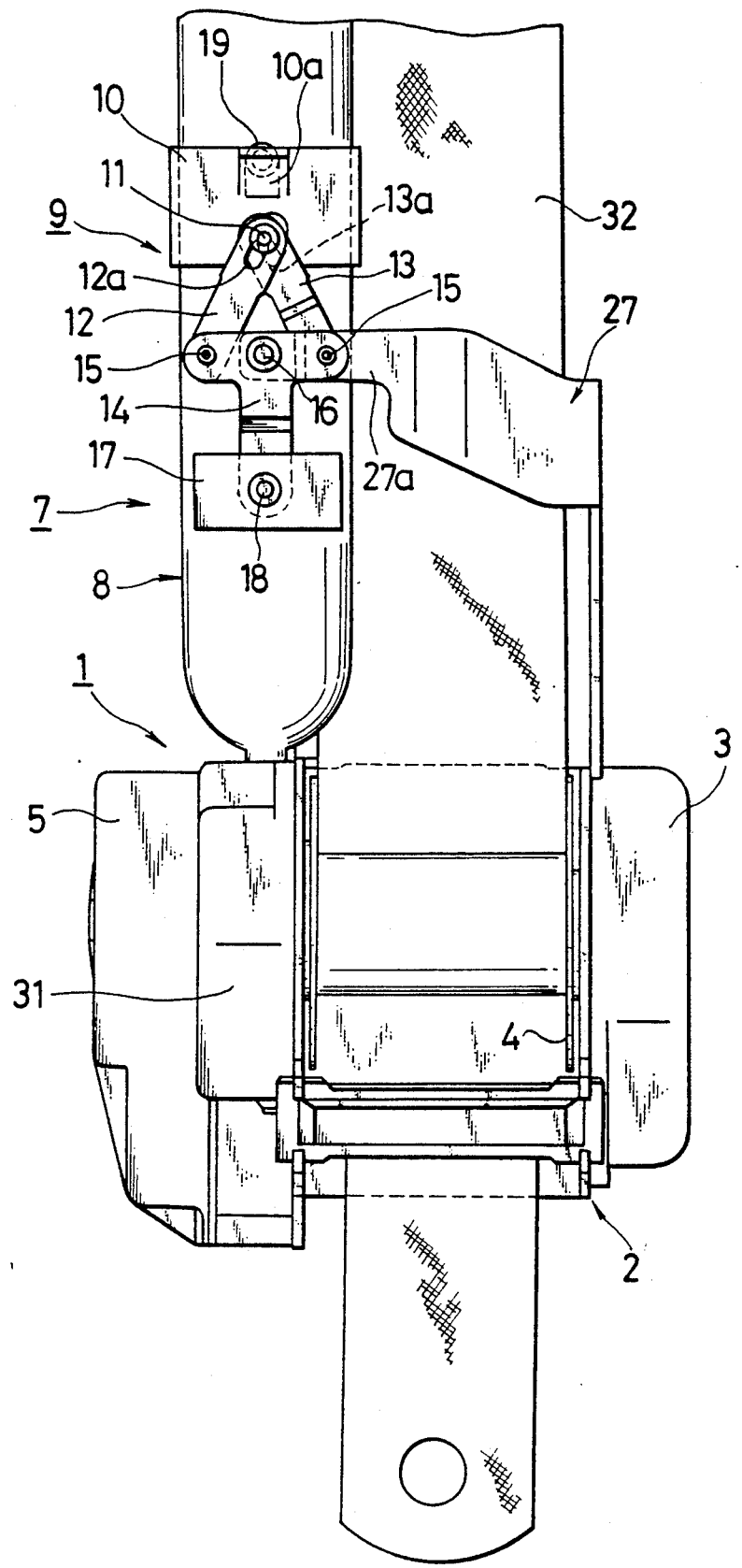
FIG. 1 is a front view of a pretensioner-equipped seat belt retractor according to a first embodiment of the present invention.
Figure 2:
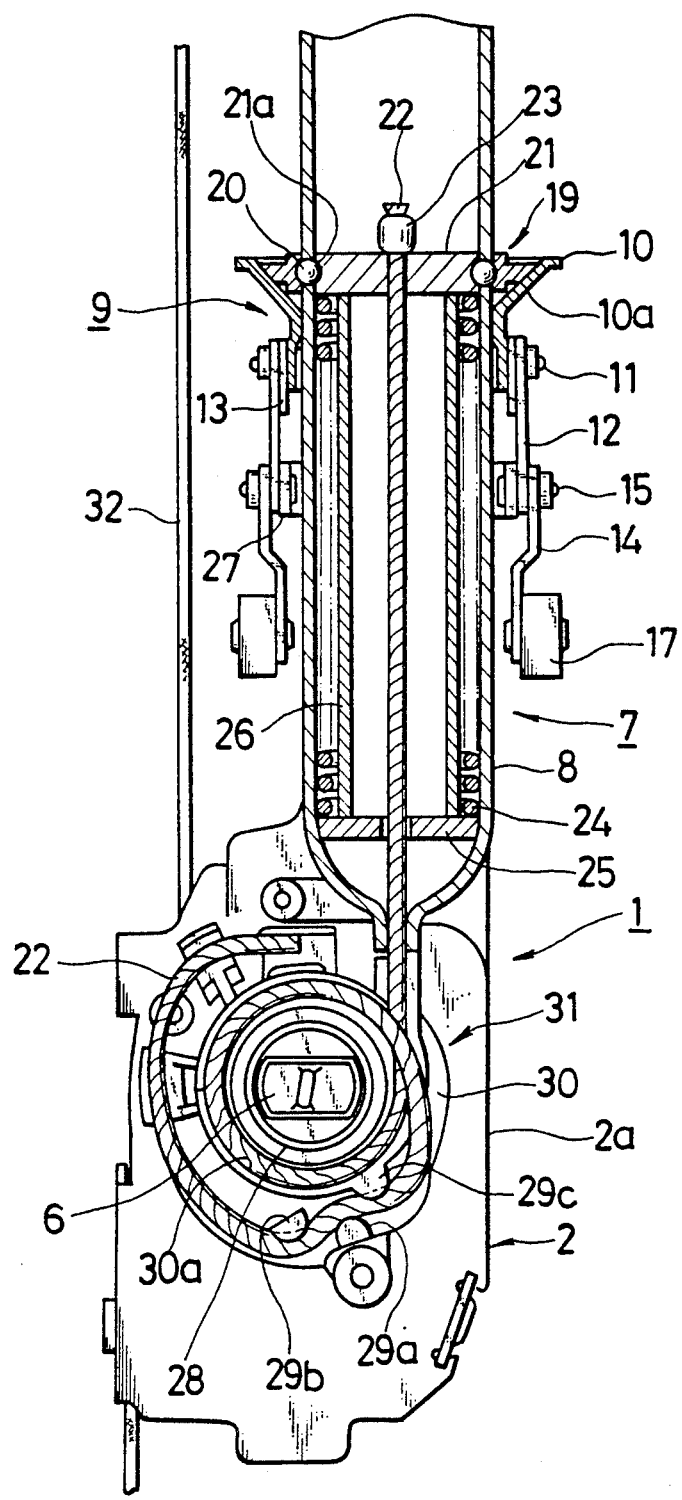
FIG. 2 is a partly cut-away side view of the pretensioner-equipped seat belt retractor of FIG. 1.

The pretensioner-equipped seat belt retractor according to the first embodiment will first be described in detail with reference to FIGS. 1 through 4. The pretensioner-equipped seat belt retractor comprises a retractor 2, which is a device for automatically winding in a webbing when the webbing is not being used, and a pretensioner 1 for eliminating slack in the webbing by instantaneously rotating a take-up spindle 6 of the retractor in a webbing-winding direction.

Like conventional retractors, the retractor 2 has a take-up spring unit 5 and an emergency locking mechanism 3. The take-up spring unit 5 is arranged on one of side walls of a retractor base 2a formed in a substantially square U shape and always biases the take-up spindle 6, to which the take-up spring unit 5 is connected, in a direction in which the webbing 32 is wound in. The emergency locking mechanism 3, on other hand, prevents rotation of the take-up spindle 6 when the webbing 32 is to be pulled out at an acceleration of at least a predetermined value, whereby any further release of the webbing 32 can be prevented.

The pretensioner 1 comprises a wound-wire tightening mechanism 31 and a drive means 7. The wound-wire tightening mechanism 31 is composed of a pulley 28 fixedly mounted on an end portion of the take-up spindle 6, said end portion being located outside the side wall of the retractor base, a wire 22 wound as a cable around the pulley 28 with a small space left therebetween, and a wire housing enclosing the pulley 28 and the wire 22 therein. The drive means 7 is adapted to pull the wire 22 at one end thereof.

As the radial spacing between a partition 30a of the wire housing 30, which constitutes the wound-wire tightening mechanism 31, and an outer peripheral wall surface of the pulley 28 is substantially greater in diameter than the wire 22 and the wire 22 is normally out of contact with the outer peripheral wall of the pulley 28, the wire 22 does not interfere with rotation of the shaft 6 in normal use. A free end portion of the wire 22 is guided to the outside of the partition 30a while being resiliently deformed among three guide portions 29a,29b,29c disposed apart from one another at small intervals.

The drive means 7 comprises a piston 21 connected to a free end of the wire 22, a cylinder 8 with the piston 21 movably received therein, a compression coil spring 24 disposed as a resilient member in the cylinder 8 to bias the piston 21 in the pulling direction of the wire 22 (i.e., upwardly of the retractor), and a trigger unit 9 releasably holding the piston 21 relative to the cylinder 8 such that the piston 21 can be maintained at a biased position against the resilient force of the compression coil spring 24 but the holding of the piston 21 at the biased position can be released responsive to an acceleration of at least a predetermined value.

The piston 21 is in the form of a disk-shaped member with a through-hole centrally formed therethrough. The free end portion of the wire 22 extends through the through-hole and is fastened by a crimp 23, so that the piston 21 is connected to the free end portion of the wire 22. A groove 21a is formed in an outer peripheral side wall of the piston 21. In a bottom part of the cylinder 8, a spring bracket 25 is arranged to support a lower end portion of the compression coil spring 24 accommodated inside the cylinder 8. A pipe 26 whose diameter is smaller than the inner diameter of the compression coil spring 24 is centrally provided upright on the spring bracket 25. The pipe 26 is provided to prevent buckling of the compression coil spring 24 in a normal compressed state and also to position the compression coil spring 24 when it is being set.

The trigger unit 9 is arranged substantially centrally relative to the length of the cylinder 8, and comprises a pair of lock balls 20 inserted in respective lock holes 8a formed in a pair in an opposing relationship in a side wall of the cylinder and normally maintained in engagement with the groove 21a to inhibit movement of the piston 21 along the length of the cylinder, a ring-shaped casing 10 holding the lock balls 20 via associated interposed members 19 arranged outside the cylinder 8 so that the lock balls 20 are not pushed out of the cylinder 8, and a pair of T-shaped levers, plates 12,13 and bridges 27 constructing link mechanisms for pulling down the casing 10 toward a base portion of the cylinder responsive to movements of corresponding inertia elements 17.

The bridge 27 extends upwardly from the retractor base and, at free end portions of a substantially square U-shaped support portion 27a extending to hold an outer peripheral portion of the cylinder 8, swingably supports the paired T-shaped levers 14 on pivots 16, respectively. To a lower end portion of each T-shaped lever 14, the corresponding inertia element 17 is pivotally attached by means of a pin 18. The plates 12,13 are pivotally connected at one end thereof to opposite end portions of the T-shaped lever 14 via pins 15, respectively. Slots 12a,13a are formed at opposite end portions of the plates 12,13 and are each fitted on a corresponding pin 11 provided on a lower side wall of the casing 10.

The casing 10 which is externally fitted on the cylinder 8 is held movably up and down relative to the cylinder by the link mechanisms. A pair of holding portions 10a, each of which has an upwardly flared, tapered surface, are formed at upper end portions of the casing 10, respectively. Fitted in each holding portion 10a is the corresponding interposed member 19 which is shaped at one end thereof complementarily with the tapered surface of the holding portion 10a and at an opposite end thereof complementarily with a spherical surface of the corresponding lock ball 20. The interposed member 19 is movable radially relative to the cylinder in accordance with a movement of the casing 10 along the length of the cylinder. Normally, the casing 10 holds the interposed members 19 at supporting portions, namely, on radially inner sides, respectively, so that the lock balls 20 are prevented from being pushed out of the cylinder 8 and hence disengaged from the piston 21.

Accordingly, the trigger unit 9 causes, by its link mechanisms, the casing 10 to move to a lower part of the cylinder in accordance with a horizontal movement of the inertia elements 17 so that the holding of the lock balls 20 is released. As a consequence, the lock balls 20 which prevent the piston 21 from moving along the length of the cylinder are disengaged from the piston 21 so that the drive means 7 is actuated.

Figure 3:
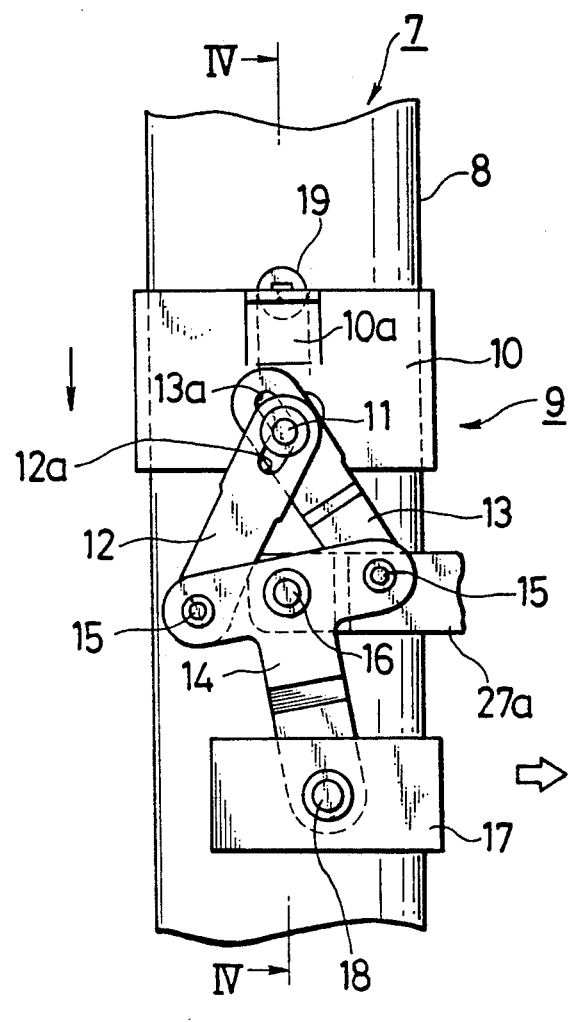
FIG. 3 is an enlarged fragmentary view of a trigger unit shown in FIG. 1.
Figure 4:
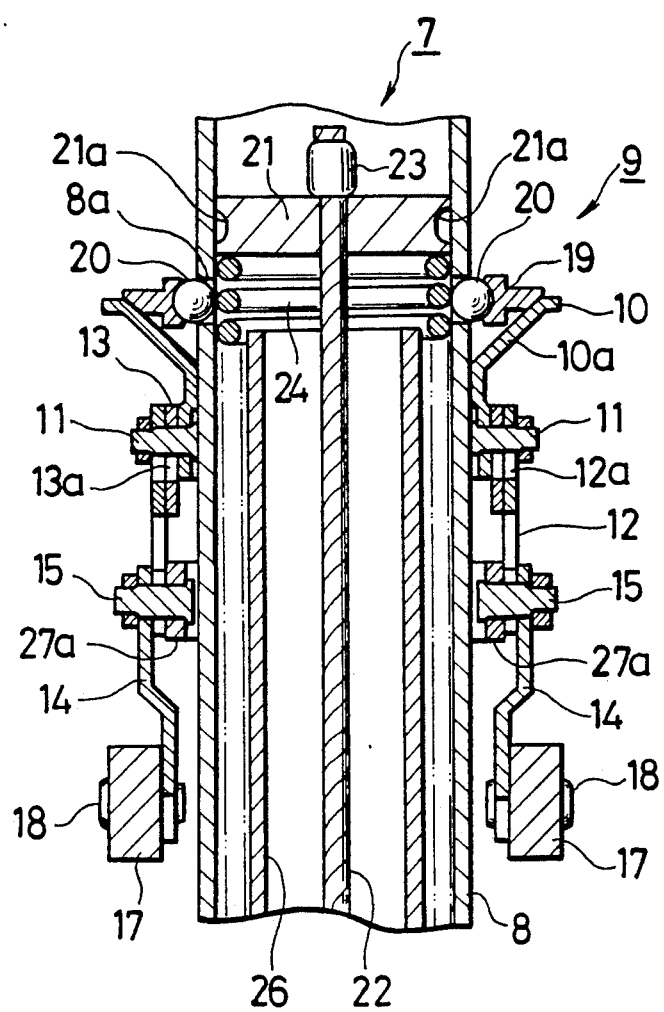
FIG. 4 is a cross-sectional view of the trigger unit, taken in the direction of arrows IV—IV of FIG. 3.

Namely, when an acceleration of at least the predetermined value occurs, the inertia elements 17 of the trigger unit 9 move horizontally so that the casing 10 is caused to move to the lower part of the cylinder as shown in FIGS. 3 and 4. This makes the interposed members 19 movable radially and outwardly relative to the cylinder, whereby the lock balls 20 are released from the held state. As a consequence, the lock balls 20 are pushed out of the cylinder 8 so that the lock balls 20 are disengaged from the piston 21. Since the piston 21 which has been released from its engagement with the lock balls 20 is now movable along the length of the cylinder, the drive means 7 is allowed to actuate. Incidentally, an acceleration required to drive the trigger unit 9 can be set as desired in view of the frictional resistance of each part of the link mechanisms, the mass of each inertia element 17, and the like.

As has been described above, the drive means 7 in the first embodiment can rotate the take-up spindle 6 of the retractor in the webbing-slack-eliminating direction via the wire 22 by the resilient force of the compression coil spring 24 so that it is not required to use a gas generator as a drive power source for the wire. The pretensioner-equipped seat belt retractor according to the first embodiment of this invention is therefore free of such a potential hazard that propellant may explode during manufacture—during assembly, for example. Since the trigger unit 9 is driven by the mechanical system, it is unnecessary to additionally provide any electric sensing means such as a collision sensor so that the construction of the pretensioner can be simplified.

Next, operation of the above pretensioner-equipped seat belt retractor will be described. In a normal running state of a vehicle, the free end side of the wire 22 in the wound-wire tightening mechanism 31 is out of contact with the outer peripheral wall of the pulley 28 so that the take-up spindle 6 can freely rotate without interference with the wire 22. Accordingly, the webbing 32 can be wound in by the biasing force of the take-up spring unit 5 and, when desired, can also be wound out against the biasing force.

When a deceleration of a certain value such as sudden braking occurs with the vehicle, the occupant is caused to sway forward so that the webbing 32 is about to be pulled out at an acceleration of a certain value. At this time, the emergency locking mechanism 3 of the retractor is actuated to lock any further rotation of the take-up spindle 6. The webbing 32 is thus prevented from being wound out, but the drive means 7 is not actuated because the holding of the lock balls 20 is not released by the trigger unit 9 by an acceleration of such a value.

When a deceleration of an extremely large, predetermined value occurs as in the event of a vehicular collision, the inertia elements 17 of the trigger unit 9 are caused to move horizontally so that the casing 10 is moved to the lower part of the cylinder. The engagement of the lock balls 20 with the piston 21 is hence released, whereby the drive means 7 is actuated. Namely, the piston 21 inside the cylinder 8 is driven upwards by the biasing force of the compression coil spring 24 so that a tension is applied to the wire 22. As a result, the portion of the wire 22, said wire portion being wound around the pulley 28 in the wound-wire tightening mechanism 31, is tightened on the outer peripheral wall of the pulley 28 because the free end portion of the wire 22 is braked by the guide portions 29a,29b,29c. Frictional engagement therefore takes place between the portion of the wire 22, said wire portion being wound around the pulley 28, and the outer peripheral wall of the pulley 28 and further upward drive of the piston 21 drives the take-up spindle 6 in the webbing-winding direction. As a consequence, the webbing 32 applied to the occupant is wound in so that any play or slack in the webbing 32 is eliminated.

Figure 5A:
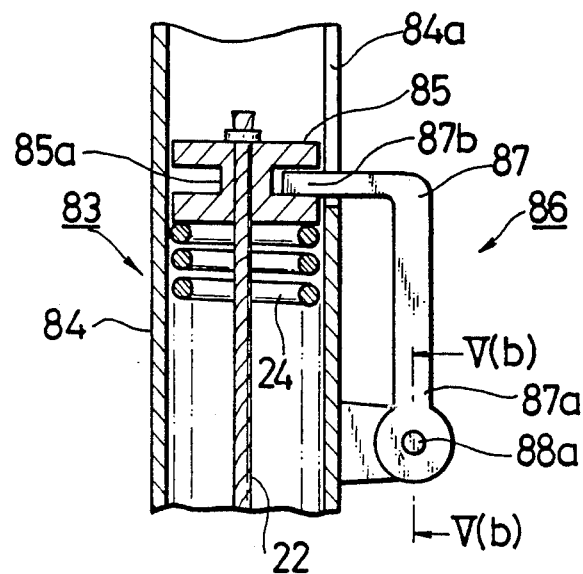
FIG. 5(a) and 5(b) are fragmentary cross-sectional view, of a drive means according to a second embodiment of the present invention.
Figure 5B:
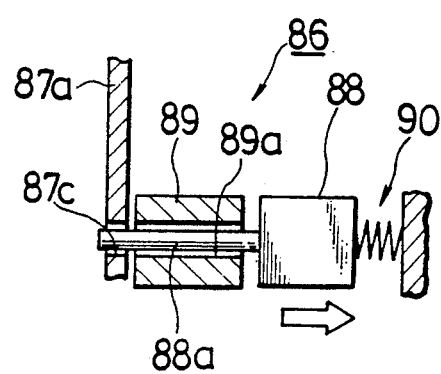

The pretensioner-equipped seat belt retractor according to the second embodiment will next be described with reference to FIGS. 5(a) and 5(b).

A drive means 83 comprises a piston 85 connected to the free end of the wire 22, a cylinder 84 with the piston 85 movably received therein, the compression coil spring 24 disposed as a resilient member in the cylinder 84 to bias the piston 85 in a pulling direction of the wire 22 (i.e., upwardly of the retractor), and a trigger unit 86 releasably holding the piston 85 such that the piston 85 can be maintained at a biased position against the resilient force of the compression coil spring 24 but the holding of the piston 85 at the biased position can be released responsive to an acceleration of at least a predetermined value.

The trigger unit 86 comprises an inertia element 88 and a substantially L-shaped arm member 87. The inertia element 88 has a pivot 88a which is inserted in a through-hole 88a in a support member 89 disposed on the cylinder. The arm member 87 has an elongated arm portion 87a and is pivotally supported at one end of the elongated arm portion 87a on a free end portion of the pivot 88a, said free end portion extending out through the through-hole 88a. The elongated arm portion 87a of the arm member 87 extends upwardly from its pivoted end portion along a side wall of the cylinder 84. The arm member 87 also has a bent end portion 87b which is located on a swinging side. The bent end portion 87b is arranged so that it extends through an opening 84a formed in the side wall of the cylinder 84 and is normally maintained in engagement with a groove 85a formed in an outer peripheral side wall of the piston 85. The inertia element 88 is biased in such a direction that the free end portion of the pivot 88a is located in a pivot hole 87c of the arm member 87 to pivotally support the arm member 87 thereon. Accordingly, the arm member 87 normally holds the piston 85 against the biasing force of the compression coil spring 24.

When a deceleration of an extremely large, predetermined value occurs as in the event of a vehicular collision, the inertia element 88 of the trigger unit 86 is caused to move under inertia against the biasing force of the compression coil spring 90 so that the pivot 88a moves out of the pivot hole 87c of the arm member 87. The arm member 87, which is no longer supported on the pivot 88a, therefore drops so that the holding of the piston 85 is released to actuate the drive means 83.

Figure 6:
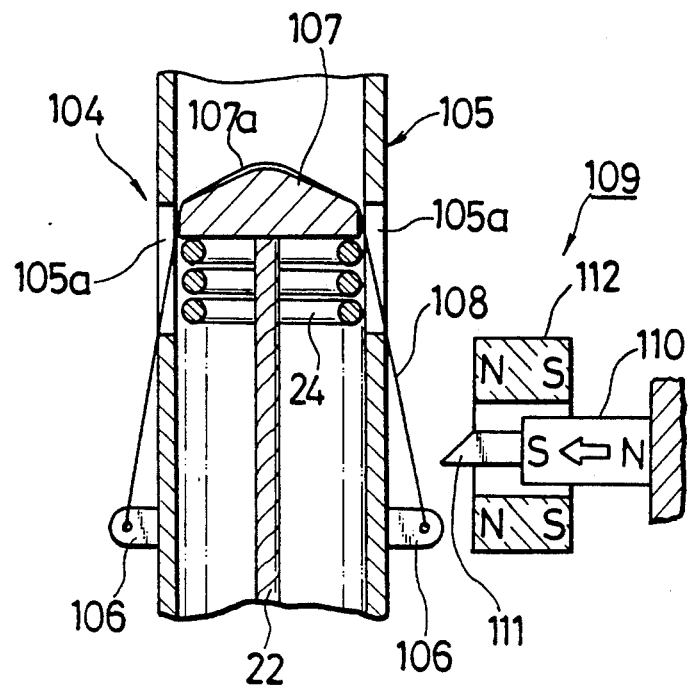
FIG. 6 is a fragmentary cross-sectional view of a drive means according to a third embodiment of the present invention.

The pretensioner-equipped seat belt retractor according to the third embodiment will now be described with reference to FIG. 6. A drive means 104 comprises a piston 107 connected to the free end of the wire 22, a cylinder 105 with the piston 107 movably received therein, the compression coil spring 24 disposed as a resilient member in the cylinder 105 to bias the piston 107 in a pulling direction of the wire 22 (i.e., upwardly of the retractor), and a trigger unit 109 releasably holding the piston 107 such that the piston 107 can be maintained at a biased position against the resilient force of the compression coil spring 24 but the holding of the piston 107 at the biased position can be released responsive to an acceleration of at least a predetermined value.

The trigger unit 109 comprises a wire 108, an inertia element 110 and a ring-shaped permanent magnet 112. The wire 108 extends through a pair of openings 105a formed in an opposing relationship in the side wall of the cylinder and is supported at opposite ends thereof on brackets, respectively. The inertia element 110 is made of a permanent magnet and is provided at a free end thereof with a cutting blade 111. The permanent magnet 112 is disposed surrounding an outer peripheral wall of the inertia element 110. The wire 108 is supported at the opposite ends thereof so that the wire 108 extends through a groove 107a formed in a top wall of the piston 107. The piston 107 is therefore held at the biased position by the wire 108. The inertia element 110 is arranged so that the cutting blade 111 attached to the free end of the inertia element 110 is biased in a direction retreating away from the wire 108 under repulsive force between its own magnetic force and the magnetic force of the permanent magnet 112. The cutting blade 111 is therefore normally separated from the wire 108.

When a deceleration of an extremely large, predetermined value occurs as in the event of a vehicular collision, the inertia element 110 is caused to move toward the cylinder 105 against the repulsive force between the inertia element 110 and the permanent magnet 112. When the inertia element 110 has moved over at least a predetermined distance toward the cylinder 105, attractive force is then developed between the inertia element 110 and the permanent magnet 112 so that biasing force acts on the inertia element 110 to move the inertia element 110 toward the cylinder 105. The inertia element 110 biased toward the cylinder 105 hence cuts off the wire 108 by the cutting blade 111 attached to the free end of the inertia element 110. After the wire 108 has been cut off, the piston 107 is allowed to move upwards under the biasing force of the compression coil spring 24 so that the drive means 104 is actuated.

Figure 7:
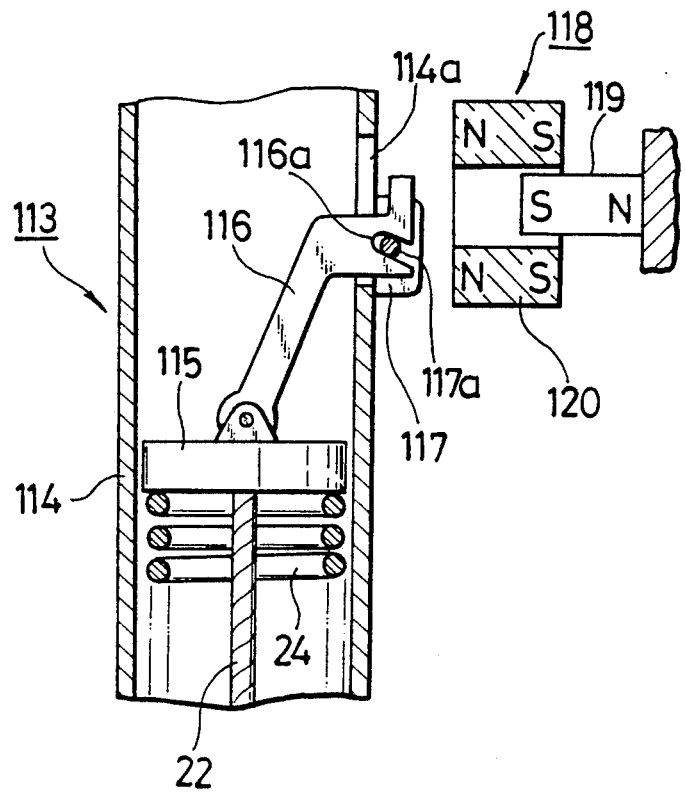
FIG. 7 is a fragmentary cross-sectional view of a drive means according to a fourth embodiment of the present invention.

The pretensioner-equipped seat belt retractor according to the fourth embodiment will hereinafter be described with reference to FIG. 7. A drive means 113 comprises a piston 115 connected to the free end of the wire 22, a cylinder 114 with the piston 115 movably received therein, the compression coil spring 24 disposed as a resilient member in the cylinder 114 to bias the piston 115 in a pulling direction of the wire 22 (i.e., upwardly of the retractor), and a trigger unit 118 releasably holding the piston 115 such that the piston 115 can be maintained at a biased position against the resilient force of the compression coil spring 24 but the holding of the piston 115 at the biased position can be released responsive to an acceleration of at least a predetermined value.

The trigger unit 118 comprises an arm member 116 pivotally supported at one end portion thereof on an upper part of the piston 115, an inertia element 119 made of a permanent magnet, and a ring-shaped permanent magnet 120 surrounding an outer peripheral wall of the inertia element 119. The arm member 116 pivotally supported at the one end portion thereof on the piston 115 is provided at an opposite end portion thereof with a notch 116a. The opposite end portion of the arm member 116 extends out through an opening 114a formed in a side wall of the cylinder 114. Outside the cylinder 114, the notch 116a is normally maintained in engagement with a shaft 117a supported on a bracket 117 provided on the side wall of the cylinder 114. The arm member 116 therefore holds the piston 115 against the biasing force of the compression coil spring 24. The inertia element 119 is disposed so that biasing force is applied under the repulsive force between the own magnetic force of the inertia element 119 and that of the permanent magnet 120 to move the inertia element 119 away from the cylinder 114. The inertia element 119 is therefore normally separated from the arm member 116.

When a deceleration of an extremely large, predetermined value occurs as in the event of a vehicular collision, the inertia element 119 is caused to move toward the cylinder 114 against the repulsive force between the inertia element 119 and the permanent magnet 120. When the inertia element 119 has moved over at least a predetermined distance toward the cylinder 114, attractive force is then developed between the inertia element 119 and the permanent magnet 120 so that biasing force acts on the inertia element 119 to move the inertia element 119 toward the cylinder 114. As a consequence, a free end of the inertia element 119 biased toward the cylinder 114 collides against the opposite end portion of the arm member 116, at which opposite end portion the notch 116a is formed. The collision of the inertia member 119 results in disengagement between the arm member 116 and the shaft 117a, whereby the arm member 116 is caused swing into the cylinder 114. The piston 115, which is no longer held by the arm member 116, therefore moves upwards under the biasing force of the compression coil spring 24 so that the drive means 113 is actuated.

Figure 8A:
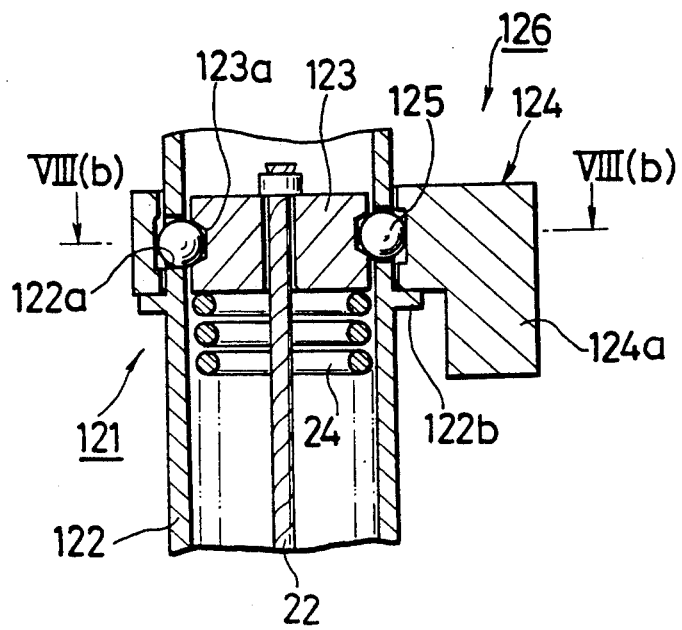
FIGS. 8(a) and 8(b) are a fragmentary cross-sectional view of a drive means according to a fifth embodiment of the present invention.
Figure 8B:
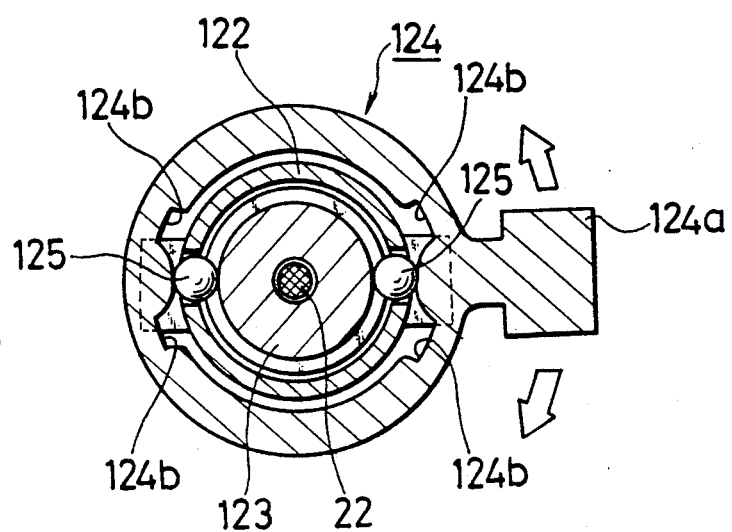

Referring next to FIGS. 8(a) and 8(b), the pretensioner-equipped seat belt retractor according to the fifth embodiment will be described. A drive means 121 comprises a piston 123 connected to the free end of the wire 22, a cylinder 122 with the piston 123 movably received therein, the compression coil spring 24 disposed as a resilient member in the cylinder 122 to bias the piston 123 in a pulling direction of the wire 22 (i.e., upwardly of the retractor), and a trigger unit 126 releasably holding the piston 123 such that the piston 123 can be maintained at a biased position against the resilient force of the compression coil spring 24 but the holding of the piston 123 at the biased position can be released responsive to an acceleration of at least a predetermined value.

The trigger unit 126 comprises a pair of lock balls 125 and a ring-shaped casing 124. The paired lock balls 125 are inserted in corresponding lock holes 122a formed in an opposing paired relationship in a side wall of the cylinder 122 and are maintained in engagement with a groove 123a formed in an outer peripheral wall of the piston 123 to prevent movements of the piston 123 along the length of the cylinder 122. The ring-shaped casing 124 holds the lock balls 125 so that the lock balls 125 are not pushed out of the cylinder 122.

The casing 124, which is externally fitted on the cylinder 122 and is supported on a flange portion 122b, is held turnably about the cylinder 122 and has an inertia portion 124a extending outwardly in a radial direction from the casing 124. In an inner peripheral wall of the casing 124, two pairs of recesses 124b are formed so that the lock balls 125 can escape outwardly of the cylinder 122. The recesses 124b arranged on the same circumference allow the lock balls 125 to move in radial directions relative to the cylinder as the casing 124 turns about the cylinder. Normally, the casing 124 holds the lock balls 125 at the supported positions thereof, namely, on a radially inner side so that the lock balls 125 are not pushed out of the cylinder 122 to release their engagement with the piston 123.

When an acceleration of at least a predetermined value occurs, the casing 124 of the trigger unit 126 turns about the cylinder under inertia of the inertia portion 124a. The recesses 124b are therefore located outside the corresponding lock balls 125, whereby the lock balls 125 can move radially and outwardly of the cylinder. The lock balls 125 are hence pushed out of the cylinder 122 and disengaged from the piston 123. Since the piston 123 becomes movable along the length of the cylinder after its disengagement from the lock balls 125, the drive means 121 is actuated.

The pretensioner-equipped seat belt retractor according to the sixth embodiment of the present invention will now be described with reference to FIGS. 9(a) and 9(b). A drive means 136 comprises a piston 138 connected to the free end of the wire 22, a cylinder 137 with the piston 138 movably received therein, the compression coil spring 24 disposed as a resilient member in the cylinder 137 to bias the piston 138 in a pulling direction of the wire 22 (i.e., upwardly of the retractor), and a trigger unit 142 releasably holding the piston 138 in the cylinder 137 such that the piston 138 can be maintained at a biased position against the resilient force of the compression coil spring 24 but the holding of the piston 138 at the biased position can be released responsive to an acceleration of at least a predetermined value.

The trigger unit 142 comprises a pair of plate members 140,141 and a pair of inertia elements 143,144. The paired plate members 140,141 have notches 140a,141a at one end portions thereof, respectively, while the paired inertia elements 143,144 are arranged on an outer side wall of the cylinder 137. The one end portions of the plate members 140,141 are disposed crossing each other above the piston 138, and a pin 139 extends through the notches 140a,141a with lower ends of the plate members 140,141 being maintained in contact with a top surface of the piston 138. The inertia members 143,144 are semi-ring-shaped bodies formed by dividing a ring-shaped body into two halves. The inertia members 143,144 are disposed movably in radial directions relative to the cylinder with the cylinder 137 being interposed between the inertia members 143,144 and are biased inwardly toward the cylinder under spring forces of corresponding compression coil springs 145. Recesses 143a,144a are formed in inner peripheral walls of the inertia elements 143,144, respectively, and upper end portions of the plate members 140,141, said upper end portions extending outwardly of the cylinder through corresponding openings 137a formed in an opposing relationship in the side wall of the cylinder 13 are locked in the recesses 143a,144a. Normally, the plate members 140,141 therefore holds the piston 138 against the biasing force of the compression coil spring 24.

When a deceleration of an extremely large, predetermined value occurs as in the event of a vehicular collision, one of the inertia elements 143,144 is caused to move radially and outwardly of the cylinder 137 against the biasing forces of the compression coil springs 145. This disturbs the balancing of support of the paired plate members 140,141 which are locked in the recesses 143a,144a of the associated inertia elements 143,144 to prevent the piston 138, whereby the plate members 140,141 become no longer possible to support the piston 138 against the biasing force of the compression coil spring 24. The piston 138, which is no longer held by the plate members 140,141, then moves upwards under the biasing force of the compression coil spring 24 so that the drive means 136 is actuated.

Figure 10A:
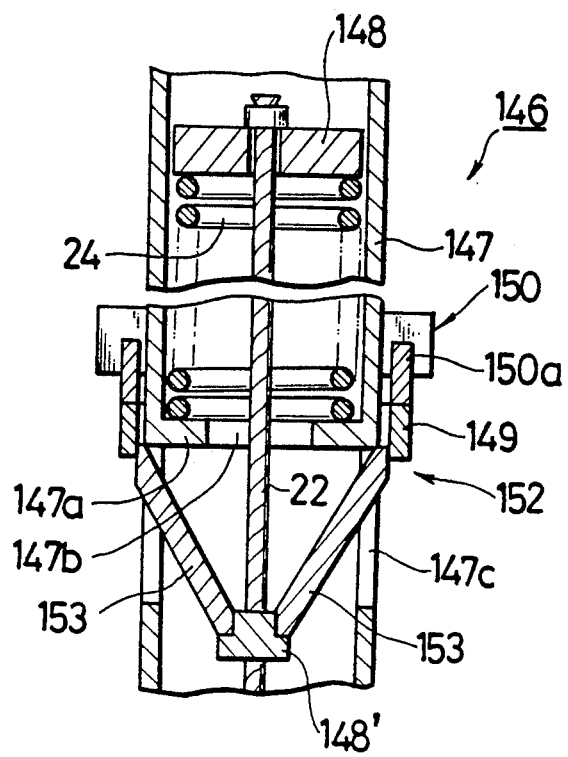
FIGS. 10(a) and 10(b) are fragmentary cross-sectional view of a drive means according to a seventh embodiment of the present invention.
Figure 10B:
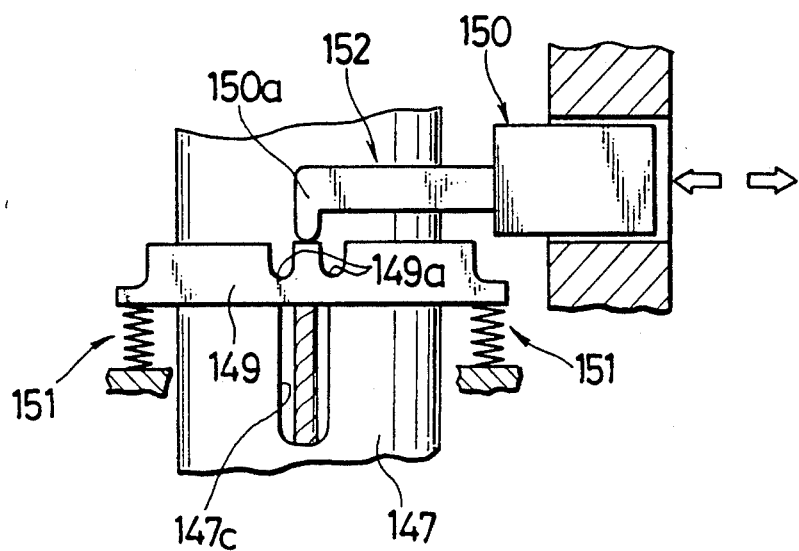

Referring next to FIGS. 10(a) and 10(b), the pretensioner-equipped seat belt retractor according to the seventh embodiment will be described. A drive means 146 comprises a piston 148 connected to the free end of the wire 22, a cylinder 147 with the piston 148 movably received therein, the compression coil spring 24 disposed as a resilient member in the cylinder 147 to bias the piston 148 in a pulling direction of the wire 22 (i.e., upwardly of the retractor), and a trigger unit 152 releasably holding the piston 148 in the cylinder 147 such that the piston 148 can be maintained at a biased position against the resilient force of the compression coil spring 24 but the holding of the piston 148 at the biased position can be released responsive to an acceleration of at least a predetermined value.

Arranged inside the cylinder 147 is a spring bracket 147a which supports the inserted compression coil spring 24 at a lower end portion thereof. A hole 147b is centrally formed through the spring bracket 147a and the wire 22 extends through the hole 147b. In a lower interior of the cylinder 147, said lower interior being defined by the spring bracket 147a, a pair of openings 147c are formed in an opposing relationship in a side wall of the cylinder 147 and the below-described trigger unit 152 is arranged.

The trigger unit 152 comprises a block 148' fixed as an engagement member on an intermediate portion of the cable 22, a ring-shaped casing 149 externally fitted on the cylinder, a pair of plate members 153, and an inertia element 150 having a pair of leg portions engageable with the casing and held movably in a horizontal direction, namely, in a direction perpendicular to the length of the cylinder 147. The casing 149 is biased toward an upper part of the cylinder by the spring force of the compression coil spring 151 but a movement of the casing 149 toward the upper part of the cylinder is limited by the leg portions 150a of the inertia element 150 so that a lower end edge of the casing 149 is located on a side of a lower part of the cylinder than upper edge portions of the openings 147c. Formed in an upper end edge of the casing 149 with which upper end edge the leg portions 150a are brought into engagement are a pair of recesses 149a into which free ends of the leg portions 150a advance, respectively. The paired plate members 153 are maintained at lower end portions thereof in contact with the block 148' and are also maintained at upper end portions thereof in engagement with the upper edge portions of the corresponding openings 147c and also with an inner peripheral surface of the casing 149. The paired plate members 153 are therefore arranged in a substantially V form. Normally, the casing 149 is therefore held in such a way that the upper end portions of the respective plate members 153 are not pushed out of the cylinder 147 and disengaged from the upper end edges of the corresponding openings 147c, whereby the respective plate members 153 can hold the piston 148 against the biasing force of the compression spring 24.

When a deceleration of an extremely large, predetermined value occurs as in the event of a vehicular collision, the inertia element 150 of the trigger unit 152 is caused to move under inertia until the free ends of the leg portions 150a move to the positions of the corresponding recesses 149a. The casing 149 is then pushed upwards by the biasing force of the compression coil spring 151, whereby the engagement between the casing 149 and the upper end portion of each plate member 153 is released. The plate members 153, the upper end portions of which are no longer held by the casing 149, can no longer support the piston 148 against the biasing force of the compression coil spring 24. The piston 148, which is no longer held by the plate members 153, then moves upwards under the biasing force of the compression coil spring 24 so that the drive means 146 is actuated.

Figure 11A:
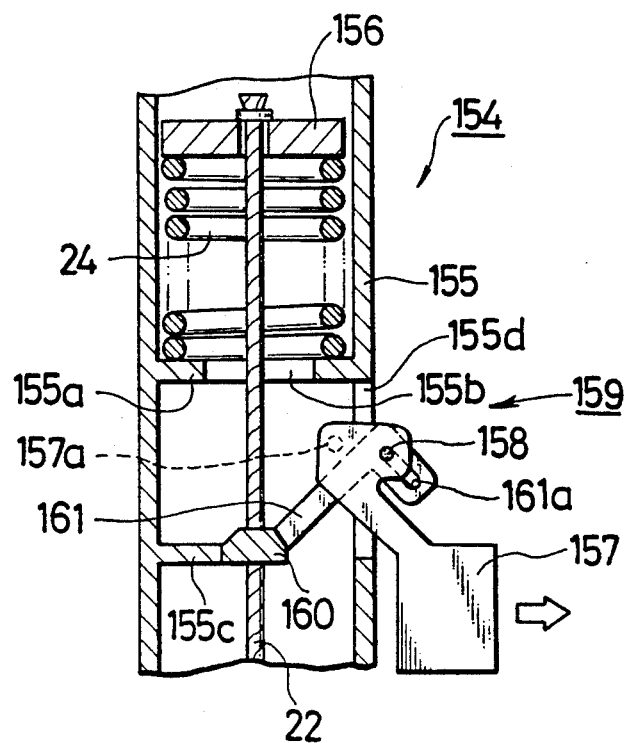
FIGS. 11(a) and 11(b) are fragmentary cross-sectional view of a drive means according to an eighth embodiment of the present invention.
Figure 11B:
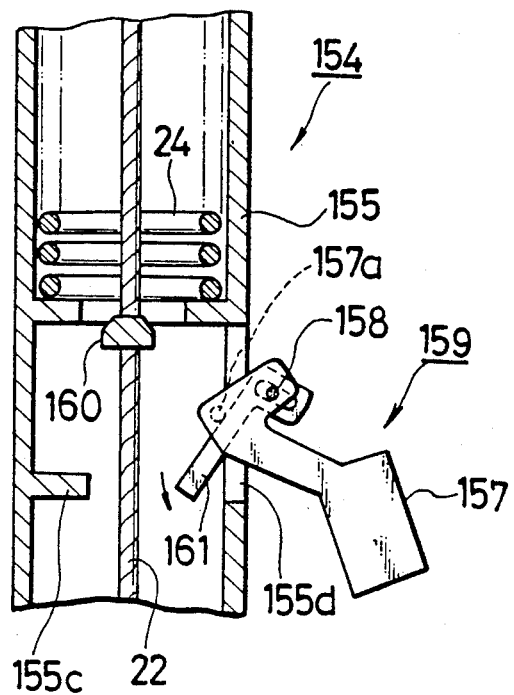

The pretensioner-equipped seat belt retractor according to the eighth embodiment of the present invention will be described next with reference to FIGS. 11(a) and 11(b). A drive means 154 comprises a piston 156 connected to the free end of the wire 22, a cylinder 155 with the piston 156 movably received therein, the compression coil spring 24 disposed as a resilient member in the cylinder 155 to bias the piston 156 in a pulling direction of the wire 22 (i.e., upwardly of the retractor), and a trigger unit 159 releasably holding the piston 156 such that the piston 156 can be maintained at a biased position against the resilient force of the compression coil spring 24 but the holding of the piston 156 at the biased position can be released responsive to an acceleration of at least a predetermined value.

Arranged inside the cylinder 155 is a spring bracket 155a which supports the inserted compression coil spring 24 at a lower end portion thereof. A hole 155b is centrally formed through the spring bracket 155a and the wire 22 extends through the hole 155b. In a lower interior of the cylinder 155, said lower interior being defined by the spring bracket 155a, the below-described trigger unit 159 is arranged.

The trigger unit 159 comprises a block 160 fixed as an engagement member on an intermediate portion of the cable 22, a lever member 161 and an inertia element 157. The lever member 161 is pivotally supported on a pivot 158 which is secured on a side wall of the cylinder 155 at a position adjacent to an opening 155d formed in the side wall of the cylinder 155. As is depicted in FIG. 11(a), the lever member 161 is pivotally supported on the pivot 158 via a slot 161a formed at one end portion thereof and the block 160 is held between a swingable opposite end portion of the lever member 161 and a flange 155c provided projecting from an inner side wall of the cylinder 155. The inertia element 157 is provided with a projection 157a which is engageable with the lever member 161. The projection 157a can turn the lever member 161 in accordance with a swinging motion of the inertia element 157. The projection 157a and the lever member 161 are normally separated from each other. The lever member 161 which is out of engagement with the projection 157a is hence hold the piston 156 against the biasing force of the compression coil spring 24.

When a deceleration of an extremely large, predetermined value occurs as in the event of a vehicular collision, the inertia element 157 of the trigger unit 159 is caused to swing about the pivot 158 under inertia and causes via its projection 157a the lever member 161 to turn. When the lever member 161 begins to turn, the center of the swinging motion is shifted inside the slot 161a to facilitate the turning of the lever member 161. As a consequence, the engagement between the swinging end portion of the lever member 161 and the block 160 is released. The piston 156, which is no longer held by the lever member 161, then moves upwards under the biasing force of the compression coil spring 24, so that the drive means 154 is actuated.

Figure 12:
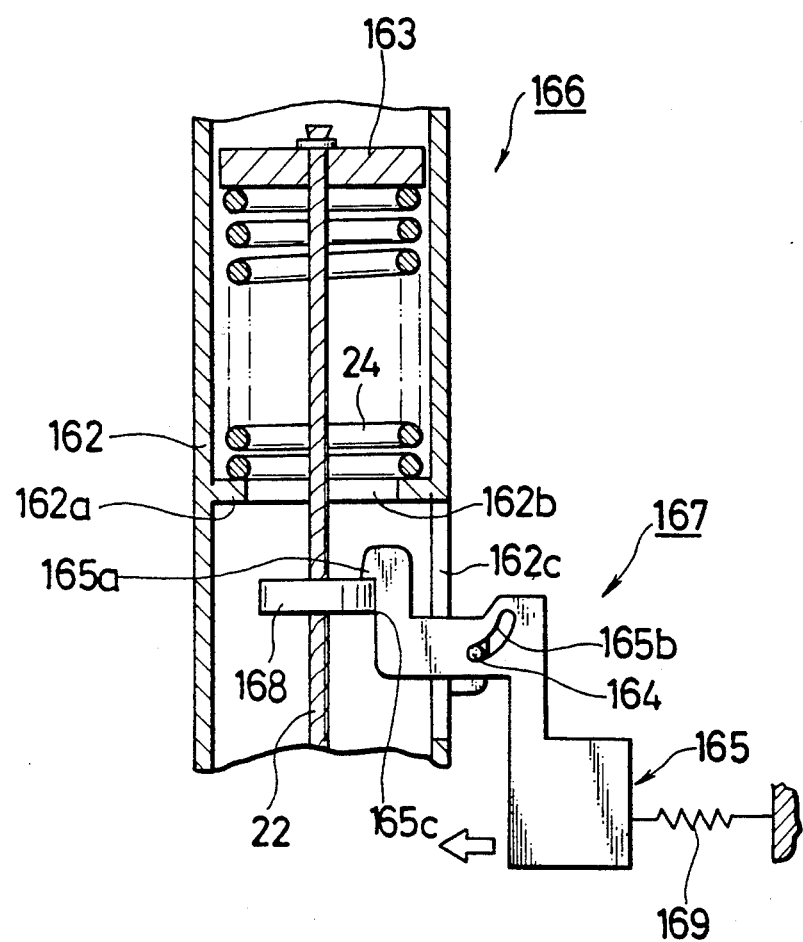
FIG. 12 is a fragmentary cross-sectional view of a drive means according to a ninth embodiment of the present invention.

Referring finally to FIG. 12, the pretensioner-equipped seat belt retractor according to the ninth embodiment of this invention will be described. A drive means 166 comprises a piston 163 connected to the free end of the wire 22, a cylinder 162 with the piston 163 movably received therein, the compression coil spring 24 disposed as a resilient member in the cylinder 162 to bias the piston 163 in a pulling direction of the wire 22 (i.e., upwardly of the retractor), and a trigger unit 167 releasably holding the piston 163 such that the piston 163 can be maintained at a biased position against the resilient force of the compression coil spring 24 but the holding of the piston 163 at the biased position can be released responsive to an acceleration of at least a predetermined value.

Arranged inside the cylinder 162 is a spring bracket 162a which supports the inserted compression coil spring 24 at a lower end portion thereof. A hole 162b is centrally formed through the spring bracket 162a and the wire 22 extends through the hole 162b. In a lower interior of the cylinder 162, said lower interior being defined by the spring bracket 162a, the below-described trigger unit 167 is arranged.

The trigger unit 167 comprises a disk-shaped block 168, an inertia element 165 and a spring 169. The block 168 is fixed as an engagement member on an intermediate portion of the cable 22. The inertia element 165 is pivotally supported on a pivot 164 provided in the vicinity of an opening 162c formed in a side wall of the cylinder 162. The spring 169 biases the inertia element 165 rightwards as viewed in FIG. 12. The inertia element 165 is pivotally supported on the pivot 164 via a slot 165b formed at an intermediate portion of the inertia element 165 and has an upper end portion 165a extending upwardly along a side wall of the block 168. The upper end portion 165a is normally in engagement with an upper peripheral edge portion of the block 168 so that the piston 163 is held against the biasing force of the compression coil spring 24.

When a deceleration of an extremely large, predetermined value occurs as in the event of a vehicular collision, the inertia element 165 of the trigger unit 167 is caused to swing about a fulcrum, that is, a point 165c of contact between the inertia element 165 and a lower peripheral edge of the block 168 so that the engagement between the upper end portion 165a and the block 168 is released. The piston 163, which is no longer held by the upper end portion 165a, then moves upwards under the biasing force of the compression coil spring 24 so that the drive means 166 is actuated.

It is to be noted that the present invention is not limited to or by the embodiments described above and can be changed or modified in various ways on the basis of the spirit of the present invention. For example, the drive power source for the drive means is not limited to such a compression coil spring as described above and another resilient member such as an extension coil spring can be used instead. Further, the wound-wire tightening mechanism which serves to rotate the take-up spindle of the retractor in a webbing-winding direction by pulling force of the cable is not limited to such mechanisms as described above, and various mechanisms can be employed.

What is claimed is:

1. A seat belt retractor having a pretensioner for bringing one end of a cable into engagement with a take-up spindle of the retractor in the event of a vehicular emergency whereby driving the cable at an opposite end thereof causes the take-up spindle to rotate in such a direction as to eliminate slack in a webbing, which comprises:
   a retractor base;
   a cylinder mounted on the base;
   a piston connected to the opposite end of the wire and disposed within the cylinder movably under the guidance of the cylinder;
   a resilient member biasing the piston in such a direction that the cable is pulled; and
   a trigger unit for holding the piston at a predetermined position against the biasing force of the resilient member, said holding of the piston being released responsive to an acceleration of at least a predetermined value, wherein the trigger unit comprises:
   a groove formed in an outer peripheral side wall of the piston;
   a pair of lock holes formed in an opposing relationship in a side wall of the cylinder;
   lock balls inserted in the lock holes, respectively, and normally maintained in engagement with the groove;
   a ring-shaped casing for holding the lock balls;
   an inertia element movable upon sensing the acceleration; and
   a link mechanism for moving the casing along the length of the cylinder responsive to a movement of the inertia element.

2. A seat belt retractor of claim 1, wherein the link mechanism comprises:
   a T-shaped lever connected at a lower end thereof to the inertia element and supported at a central upper end thereof on the retractor base;
   a pair of plates extending from opposite ends of an upper end of the T-shaped lever in such a way that the plates cross each other at upper ends thereof; and
   a pin provided on the casing and received in slots formed in the upper ends of the plates.

3. A seat belt retractor having a pretensioner for bringing one end of a cable into engagement with a take-up spindle of the retractor in the event of a vehicular emergency whereby driving the cable at an opposite end thereof causes the take-up spindle to rotate in such a direction as to eliminate slack in a webbing, which comprises:
   a retractor base;
   a cylinder mounted on the base;
   a piston connected to the opposite end of the wire and disposed within the cylinder movably under the guidance of the cylinder;
   a resilient member biasing the piston in such a direction that the cable is pulled; and
   a trigger unit for holding the piston at a predetermined position against the biasing force of the resilient member, said holding of the piston being released responsive to an acceleration of at least a predetermined value, wherein the trigger unit comprises:
   a wire extended through openings formed in an opposing relationship in a side wall of the cylinder and supported at opposite ends thereof on the side wall of the cylinder, said wire extending through a groove formed in a top wall of the piston; 'an inertia element made of a first permanent magnet and provided at an end thereof with a cutting blade; and
   a second permanent magnet surrounding an outer peripheral wall of the inertia element.

4. A seat belt retractor of claim 3, wherein the inertia element is biased in a direction retreating away from the cylinder under repulsive force between its own magnetic force and the magnetic force of the permanent magnet.

5. A seat belt retractor having a pretensioner for bringing one end of a cable into engagement with a take-up spindle of the retractor in the event of a vehicular emergency whereby driving the cable at an opposite end thereof causes the take-up spindle to rotate in such a direction as to eliminate slack in a webbing, which comprises:
   a retractor base,
   a cylinder mounted on the base;
   a piston connected to the opposite end of the wire and disposed within the cylinder movably under the guidance of the cylinder;
   a resilient member biasing the piston in such a direction that the cable is pulled; and
   a trigger unit for holding the piston at a predetermined position against the biasing force of the resilient member, said holding of the piston being released responsive to an acceleration of at least a predetermined value, wherein the trigger unit comprises:
   an upper arm member pivotally supported at an end thereof on an upper part of the piston;
   means for holding an opposite end of the arm member on the cylinder;
   an inertia element made of a first permanent magnet, said inertia element, upon sensing an acceleration of at least a predetermined value, being brought into contact with the opposite end of the arm member whereby the holding of the opposite end of the arm member is released; and
   a second permanent magnet surrounding an outer peripheral wall of the inertia element.

6. A seat belt retractor of claim 5, wherein the inertia element is biased in a direction retreating away from the cylinder under repulsive force between its own magnetic force and the magnetic force of the permanent magnet.

7. A seat belt retractor having a pretensioner for bringing one end of a cable into engagement with a take-up spindle of the retractor in the event of a vehicular emergency whereby driving the cable at an opposite end thereof causes the take-up spindle to rotate in such a direction as to eliminate slack in a webbing, which comprises:
- a retractor base;
- a cylinder mounted on the base;
- a piston connected to the opposite end of the wire and disposed within the cylinder movably under the guidance of the cylinder;
- a resilient member biasing the piston in such a direction that the cable is pulled; and
- a trigger unit for holding the piston at a predetermined position against the biasing force of the resilient member, said holding of the piston being released responsive to an acceleration of at least a predetermined value, wherein the trigger unit comprises:
- a groove formed in an outer peripheral side wall of the piston;
- a pair of lock holes formed in an opposing relationship in a side wall of the cylinder;
- lock balls inserted in the lock holes, respectively, and normally maintained in engagement with the groove;
- a ring-shaped casing for holding the lock balls, said casing having an inertia portion, which is formed radially outside the casing for sensing the acceleration, and recesses formed in an inner peripheral wall of the casing; and
- means for causing the casing to turn about the cylinder in accordance with a movement of the inertia portion.

8. A seat belt retractor having a pretensioner for bringing one end of a cable into engagement with a take-up spindle of the retractor in the event of a vehicular emergency whereby driving the cable at an opposite end thereof causes the take-up spindle to rotate in such a direction as to eliminate slack in a webbing, which comprises:
- a retractor base;
- a cylinder mounted on the base;
- a piston connected to the opposite end of the wire and disposed within the cylinder movably under the guidance of the cylinder;
- a resilient member biasing the piston in such a direction that the cable is pulled; and
- a trigger unit for holding the piston at a predetermined position against the biasing force of the resilient member, said holding of the piston being released responsive to an acceleration of at least a predetermined value, wherein the trigger unit comprises:
- a pair of plate members arranged in a substantially V-shape and maintained at lower ends thereof in contact with an upper part of the piston; and
- inertia elements holding upper ends of the plate members, respectively, and biased in a direction approaching toward the cylinder.

9. A seat belt retractor having a pretensioner for bringing one end of a cable into engagement with a take-up spindle of the retractor in the event of a vehicular emergency whereby driving the cable at an opposite end thereof causes the take-up spindle to rotate in such a direction as to eliminate slack in a webbing, which comprises:
- a retractor base;
- a cylinder mounted on the base;
- a piston connected to the opposite end of the wire and disposed within the cylinder movably under the guidance of the cylinder;
- a resilient member biasing the piston in such a direction that the cable is pulled; and
- a trigger unit for holding the piston at a predetermined position against the biasing force of the resilient member, said holding of the piston being released responsive to an acceleration of at least a predetermined value, wherein the trigger unit comprises:
- an engagement member fixed on an intermediate portion of the cable;
- a ring-shaped casing externally fitted on the cylinder and having a recess;
- a pair of plate members normally maintained in engagement with the engagement member and the casing and
- an inertia element having a leg portion engageable with the recess of the casing and disposed movably in a direction perpendicular to the length of the cylinder, the engagement between the paired plate members and the casing being released upon engagement of the leg portion of the inertia element with the recess of the casing.

10. A seat belt retractor having a pretensioner for bringing one end of a cable into engagement with a take-up spindle of the retractor in the event of a vehicular emergency whereby driving the cable at an opposite end thereof causes the take-up spindle to rotate in such a direction as to eliminate slack in a webbing, which comprises:
- a retractor base;
- a cylinder mounted on the base;
- a piston connected to the opposite end of the wire and disposed within the cylinder movably under the guidance of the cylinder;
- a resilient member biasing the piston in such a direction that the cable is pulled; and
- a trigger unit for holding the piston at a predetermined position against the biasing force of the resilient member, said holding of the piston being released responsive to an acceleration of at least a predetermined value, wherein the trigger unit comprises:
- an engagement member fixed on an intermediate portion of the cable;
- a lever member having a slot through which a pivot provided on the cylinder extends to pivotally support the lever member, said lever member being normally maintained at an end thereof in engagement with the engagement member; and
- an inertia element having a projection, which is engageable with the lever member, and pivotally supported on the pivot.

* * * * *